United States Patent [19]
Lear

[11] Patent Number: 5,636,354
[45] Date of Patent: Jun. 3, 1997

[54] DATA PROCESSOR WITH SERIALLY ACCESSED SET ASSOCIATIVE MEMORY CACHE INTERFACE AND METHOD

[75] Inventor: James A. Lear, Austin, Tex.

[73] Assignee: Motorola Inc., Schaumburg, Ill.

[21] Appl. No.: 300,239

[22] Filed: Sep. 6, 1994

[51] Int. Cl.⁶ .................................................. G06F 12/08
[52] U.S. Cl. ........................... 395/403; 395/467; 395/496
[58] Field of Search ..................................... 395/403, 467, 395/425, 496

[56] References Cited

U.S. PATENT DOCUMENTS

| | | | |
|---|---|---|---|
| 5,113,506 | 5/1992 | Moussouris et al. | 395/400 |
| 5,307,477 | 4/1994 | Taylor et al. | 395/425 |
| 5,317,718 | 5/1994 | Jouppi | 395/425 |
| 5,325,507 | 6/1994 | Freitas et al. | 395/425 |
| 5,345,576 | 9/1994 | Lee et al. | 395/425 |

*Primary Examiner*—David K. Moore
*Assistant Examiner*—Kevin Verbrugge
*Attorney, Agent, or Firm*—Lee E. Chastain

[57] ABSTRACT

A memory cache interface (12) serially accesses each way in an M-way set asociative memory cache (11) when it performs a read operation. The memory cache returns a data quantum and a tag corresponding to each presented input. The memory cache interface presents a portion of a main memory address and a new value of a way signal to the memory cache until it finds a match between the output tag and the remainder of the main memory address. The memory cache interface allows set-associative caches to be constructed from simple memory blocks for use with devices in which the memory cache interface may be incorporated. The memory cache interface may be incorporated into such devices as data processors and microcontrollers.

6 Claims, 4 Drawing Sheets

DATA PROCESSOR WITH SERIALLY ACCESSED SET ASSOCIATIVE MEMORY CACHE INTERFACE AND METHOD

FIELD OF THE INVENTION

The present invention generally relates to digital computing systems, and more specifically to memory caches.

BACKGROUND OF THE INVENTION

Memory caches are storage systems incorporated into data processing systems for performance reasons. A memory cache stores a subset of the contents of the data processing system's main memory for use by a selected subsystem, typically the system's data processor. A memory cache can supply data to the data processor faster than the main memory can because of several reasons. First, the memory cache is often made of higher grade memory circuits than is the main memory system. These circuits can operate at a higher clock rate than can the main memory. Also, there may be a dedicated bus between the data processor and the memory cache that results in higher bandwidth between the data processor and the memory cache than between the data processor and the main memory. Finally, a memory cache may be physically located on the same integrated circuit as the subsystem to which it provides data. In this case, the memory cache is constructed from faster circuits and there is a dedicated bus between the memory cache and the data processor.

Associativity is one variable that defines memory cache designs. Associativity describes the number of memory cache locations to which each main memory subsystem location may be mapped. For instance, the contents of each main memory location may be mapped to one of two different locations in a two-way set associative memory cache. When the data processor requests the contents of a certain main memory location, the data processor compares the contents of a tag associated with each of the two possible storage locations to a portion of the address of the requested data. The tag is stored in a random access memory ("RAM") associated with each memory cache entry or "cache line." One or none of the tags will match the address portion depending upon the prior history of the data processor. If one of the tags matches, then the associated memory cache location contains the requested data, a cache "hit." If neither of the tags matches, then no memory cache location contains the requested data, a cache "miss."

The selection of the degree of associativity of a cache is a compromise between a desired "hit rate" of the cache or its performance, the minimum cache access time, and the maximum allowable cache complexity. The higher the degree of associativity of a cache, the greater the number of eligible locations in which to store any particular cache line. The greater the number of eligible locations, the more selective the replacement algorithm. Selective replacement algorithms are able to keep desirable cache lines in the memory cache for a longer period of time relative to less desirable cache lines. Therefore, the higher the associativity of a memory cache, the greater the probability of a cache hit. Unfortunately, as the associativity of a memory cache grows, so grows the number of parallel look-ups into the cache necessary to extract the tag information. Also, as the associativity grows, so grows the number of address-tag comparisons necessary to determine if the cache line is present in the memory cache. These characteristics increase the complexity and access time of the cache beyond a simple block of RAM.

The decreased speed and increased complexity of an associative cache may be especially critical if the cache is external to the circuit which requests the cache line; i.e. not an integrated cache. The access time of a non-integrated cache is already degraded by the inherent performance of chip-to-chip data transfers. Also, specialized interface circuits increase the cost and reduce the development time of systems in which they are incorporated.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
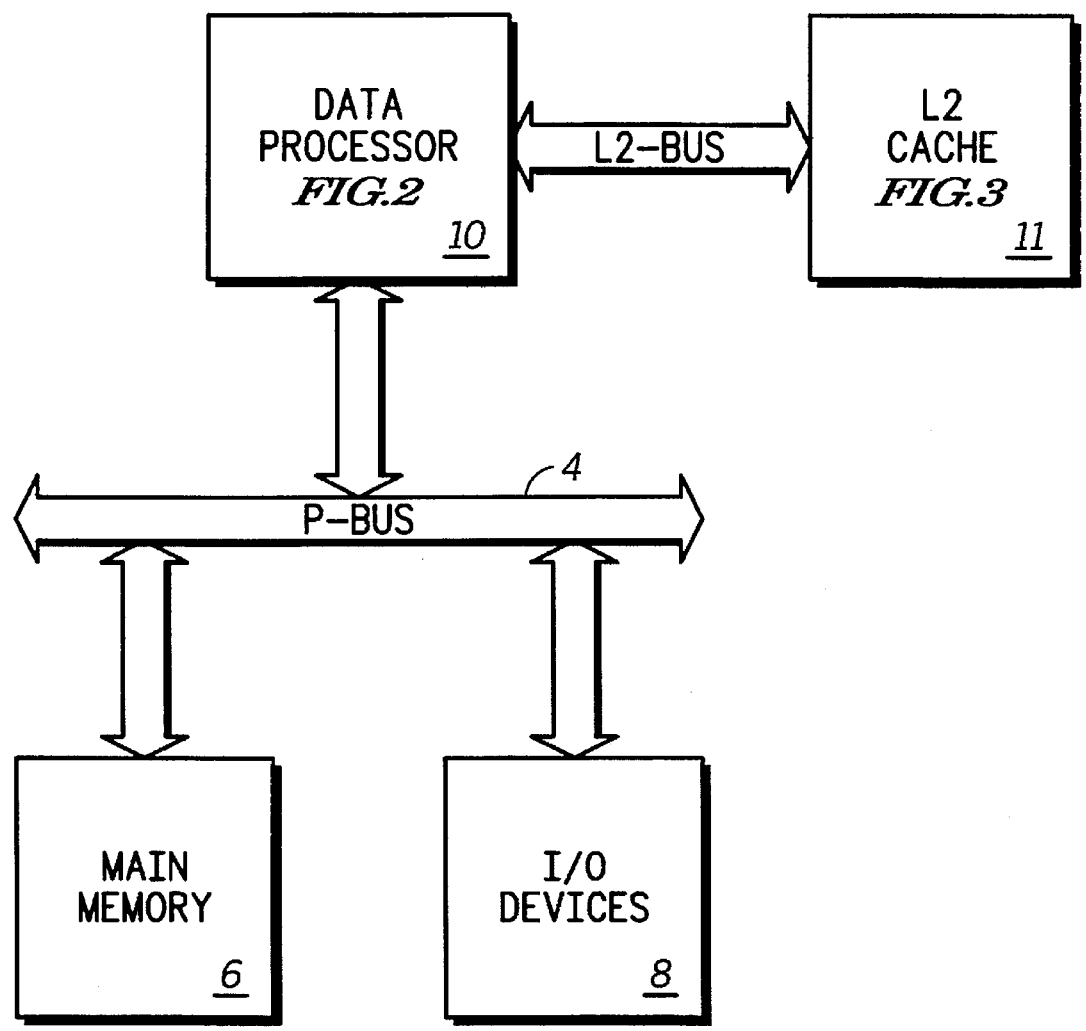
FIG. 1 depicts a block diagram of a data processing system constructed in accordance with the present invention.

FIG. 1 depicts a block diagram of a data processing system 2 constructed in accordance with the present invention. Data processing system 2 is constructed around a processor bus 4 (labeled P-Bus") by which a main memory system 6, an input/output device (labeled "I/O Devices") 8, and a data processor 10 are inter-connected. Data processor 10 is also connected to an external memory cache 11 (labeled "L2 cache") by an L2 bus. Memory cache 11 stores a subset of the data stored in main memory system 6. Memory cache 11 is designed as a two-way set associative cache to increase its cache line hit rate. However, memory cache 11 may be manufactured from simple high speed synchronous static random access memory ("SRAM") chips without additional logic and with minimal increase to the SRAM access time. Data processor 10 serially accesses each of the two ways in memory cache 11 and performs a tag comparison operation to determine whether a hit or miss occurred in the accessed way. The disclosed invention may be easily extend to caches having an associativity degree greater than two.

Continuing with FIG. 1, main memory system 6 stores data and instructions for execution by data processor 10. These stored data and instructions are a superset of the data and instructions stored in memory cache 11. Memory cache 11 is further described in connection with FIG. 3. The data and instructions stored in memory cache 11 are themselves a superset of the data and instructions stored in a data cache and instruction cache within data processor 10 (depicted in FIG. 2). This hierarchy of memory storage systems provides a spectrum of memory size and memory access time combinations: the smaller a memory system, the shorter its access time. However, the disclosed invention is not limited to a secondary ("L2") cache configurations. I/O device 8 genetically represent any one or more of a class of devices used to input data to and from data processing system 2. Hard disk drives, keyboards, video displays are members of this class. I/O device 8 may also include bridge devices to connect P-bus 4 to other industry standard busses.

Figure 2:
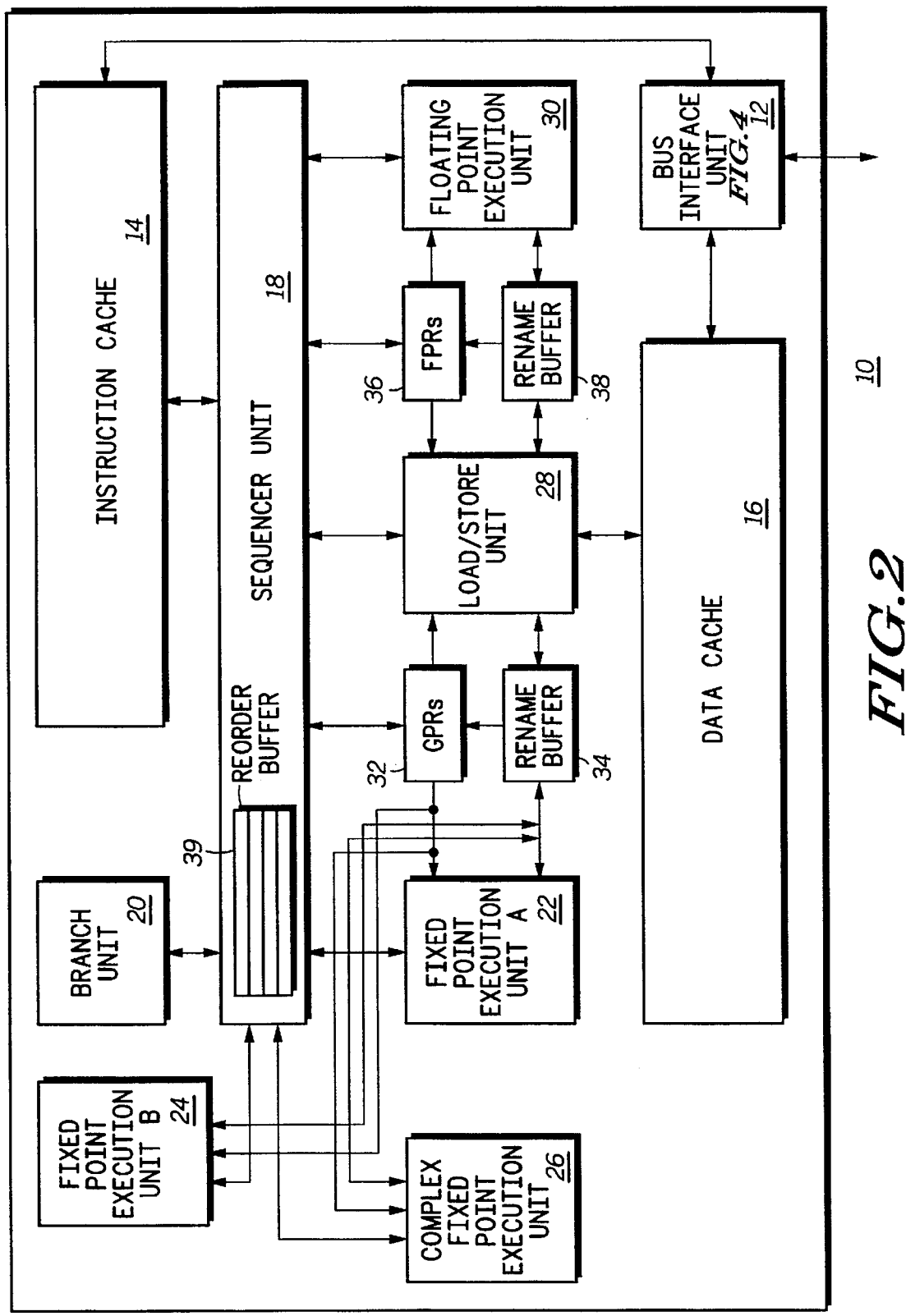
FIG. 2 depicts a block diagram of the data processor depicted in FIG. 1.

FIG. 2 depicts a block diagram of the data processor 10 depicted in FIG. 1. A bus interface unit (hereafter BIU) 12 controls the flow of data between data processor 10 and the remainder of a data processing system 2. BIU 12 is further described in connection with FIGS. 4 and 5. BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. First rename buffer 34 is more fully described below in connection with FIGS. 3 and 4. Floating point execution unit 30 and load/store execution unit 28 read and write their results to a floating point architectural register file 36, (labeled FPRs and hereafter FPR file) and to a second rename buffer 38.

The operation of data processor 10 without the disclosed invention is known in the art. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining." Branch unit 20 determines what sequence of programmed instructions is appropriate given the contents of certain data registers and the instructions themselves. Instruction cache 14 provides this sequence of programmed instructions to sequencer unit 18. If instruction cache 14 does not contain the required instructions, then it will fetch them from memory cache 11 via BIU 12. If memory cache 11 does not contain the required instructions, then BIU 12 will fetch them from main memory system 6.

Sequencer unit 18 dispatches the individual instructions of the sequence of programmed instructions to the various execution units 20, 22, 4, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 maintains a reorder buffer 39 to coordinate this updating. Reorder buffer 39 is a FIFO queue that stores a portion of the programmed instruction stream in its original order. Sequencer unit 18 waits until the oldest instruction in reorder buffer 39 has completed. Then, sequencer unit 18 updates the architectural register with the result stored in the rename buffer entry allocated for the instruction. Sequencer unit 18 also invalidates the instruction's entry in reorder buffer 39 to make room for later instructions. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to memory cache 11 and/or main memory system 6 depending upon operating characteristics of data processing system 2 not relevant to the disclosed invention. Conversely, load/store unit 28 reads data stored in data cache 16 and writes the read data to first rename buffer 34 or second rename buffer 38. If data cache 16 does not contain the required data, then it will fetch it from memory cache 11 via BIU 12. If memory cache 11 does not contain the required data, then BIU 12 will fetch it from main memory system 6.

The operation of data processor 10 with the disclosed invention is described below in connection with FIGS. 3 through 5.

Figure 3:
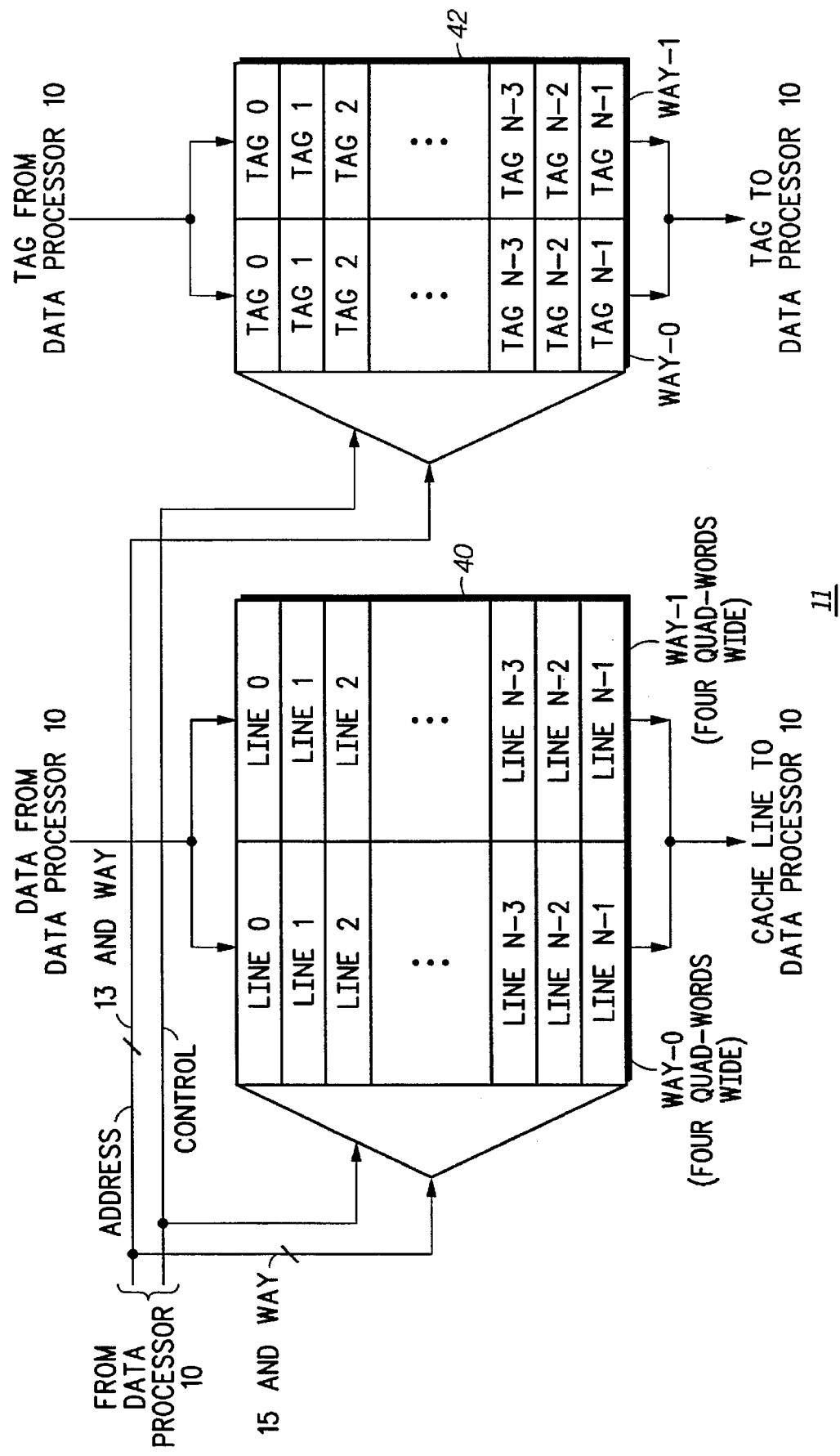
FIG. 3 depicts a block diagram of the memory cache depicted in FIG. 1.

FIG. 3 depicts a block diagram of memory cache 11 depicted in FIG. 1. Memory cache 11 is a two-way set associative cache containing storage locations for 2 by 8,192 cache lines. In the depicted embodiment, a cache line is sixty-four consecutive bytes (512 bits) aligned on a quad quad-word boundary. The address of the first byte in a quad quad-word aligned cache line contains six least significant zeros. Each cache line stored in memory cache 11 may be stored in either of two locations of a data block 40 depending upon the a subset of the address sent to BIU 12.

Data processor 10 can address up to $2^{40}$ bytes of memory space. The twenty-one most significant bits of each forty bit address (Address $Bit_0$ through Address $Bit_{20}$) are stored as a tag in memory cache 11. The next thirteen bits (Address $Bit_{21}$ through Address $Bit_{33}$) are used to select a particular cache line in memory cache 11. The next two bits (Address $Bit_{34}$, Address $Bit_{35}$) select the desired quad-word within the cache line. Finally, the four least significant bits (Address $Bit_{36}$ through Address $Bit_{39}$) specify a particular byte within the desired quad word. These four least significant bits, are invisible to memory cache 11.

Each location in data block 40 has a corresponding location in a tag block 42 containing twenty-one tag bits. The combination of the twenty-one tag bits corresponding to a particular location in data block 40 and the thirteen bits used to address the location uniquely identify a single cache line in main memory system 6.

Data processor 10 can either read from or write to memory cache 11 depending upon its various operations. Data processor 10 generates a control signal CONTROL to indicate whether each supplied fifteen bit address-one bit way indexing set is an input to or an output of memory cache 11.

In a read operation, data processor 10 supplies fifteen bits of the address of a requested aligned quad-word (128 bits) and a first value of a way address to memory cache 11. The requested quad-word in a cache line is referred to as the "critical quad-word." The address of the first byte in an aligned quad-word contains four least significant zeros. In the depicted embodiment, memory cache 11 is a two-way set associative cache. Therefore a single additional address signal can uniquely address all ways (sixteen address signals in total). In general, an M-way set associative cache requires $\log_2(M)$ control signals, rounded up to the nearest whole number, to address every way. This sixteen bit address causes data block 40 to output the critical quad word associated with the address and with the way to data processor 10.

Simultaneous with the data access, tag block 42 uses the thirteen most significant bits of the same address and the first value of the way address to select the address tag corresponding to the output critical quad-word (fourteen address signals in total). In the depicted embodiment, all quad words within an aligned quad quad-word have the same tag. Therefore, only the thirteen most significant bits of the address are necessary to index the corresponding tag.

Data processor 10 receives the output quad-word and the corresponding tag together. Data processor 10 compares the twenty-one bit tag to the twenty-one most significant bits of the address of the requested critical quad-word. (The twenty-one most significant bits of the requested quad-word are not output to memory cache 11.) If these two twenty-one bit address portions are identical, then the received critical quad-word is in fact the requested quad-word, a "hit." In the case of a hit, data processor 10 latches the corresponding data for use. If these two twenty-one bit address portions are not identical, then the received critical quad-word is not the requested quad-word, a "miss." In the case of a "miss," data processor 10 increments the value of the way address bit(s) and requests the critical quad-word and tag associated with the next sequential way. Data processor 10 continues this serial access of memory cache 11 until it finds a hit or until it searches all possible ways. If data processor 10 does not find a hit after searching all ways within memory cache 11, then data processor 10 must request the data from main memory system 6.

Data processor 10 provides the next serial way address to memory cache 11 before it performs the previous compare operation and, therefore, before it knows whether it must search the next way. This strategy is advantageous because the SRAMs in memory cache 11 are pipelined. Memory cache 11 can begin accessing the critical quad-word and tag associated with next way address as it outputs the previous critical quad-word and tag. Data processor 10 will have the next way's output as soon as possible in the event of a miss in the previous way.

In certain embodiments, it may be advantageous to provide the other quad-words in the cache line to data processor 10. Memory use often exhibits locality of reference, i.e. memory near accessed memory will likely be used in the immediate future. Therefore, data processor 10 may incorporate algorithms to read the "non-critical quad-words" in a cache line after reading the critical quad-word in the cache line. These algorithms will be dependent upon the access time of memory cache 11 and other variables not related to the disclosed invention. For instance, it may be advantageous for data processor 10 to wait for a hit before it requests the non-critical quad-words from the "hitting" way. In other cases, it may be advantageous for data processor 10 to begin requesting the next sequential non-critical quad word of each possible way before it determines a hit.

In a write operation, data processor 10 supplies fifteen address bits, a way bit, one hundred and twenty-eight data bits (an "output quad-word"), and twenty-one tag bits to memory cache 11. Data block 40 stores the output quad-word in the way and line indexed by the sixteen bits. Similarly, tag block 42 stores the twenty-one tag bits in its storage location indexed by the thirteen most significant bits of the fifteen address bits and by the way bit.

Data processor 10 may incorporate various algorithms to select which way it writes to during a write operation. The selection of the replacement way affects which data is stored in memory cache 11 and which data is discarded from memory cache 11. These algorithms include replace invalid way, replace least recently used way (read or write), replace least recently written way, replace least recently read way, replace random way, etc.

Figure 4:
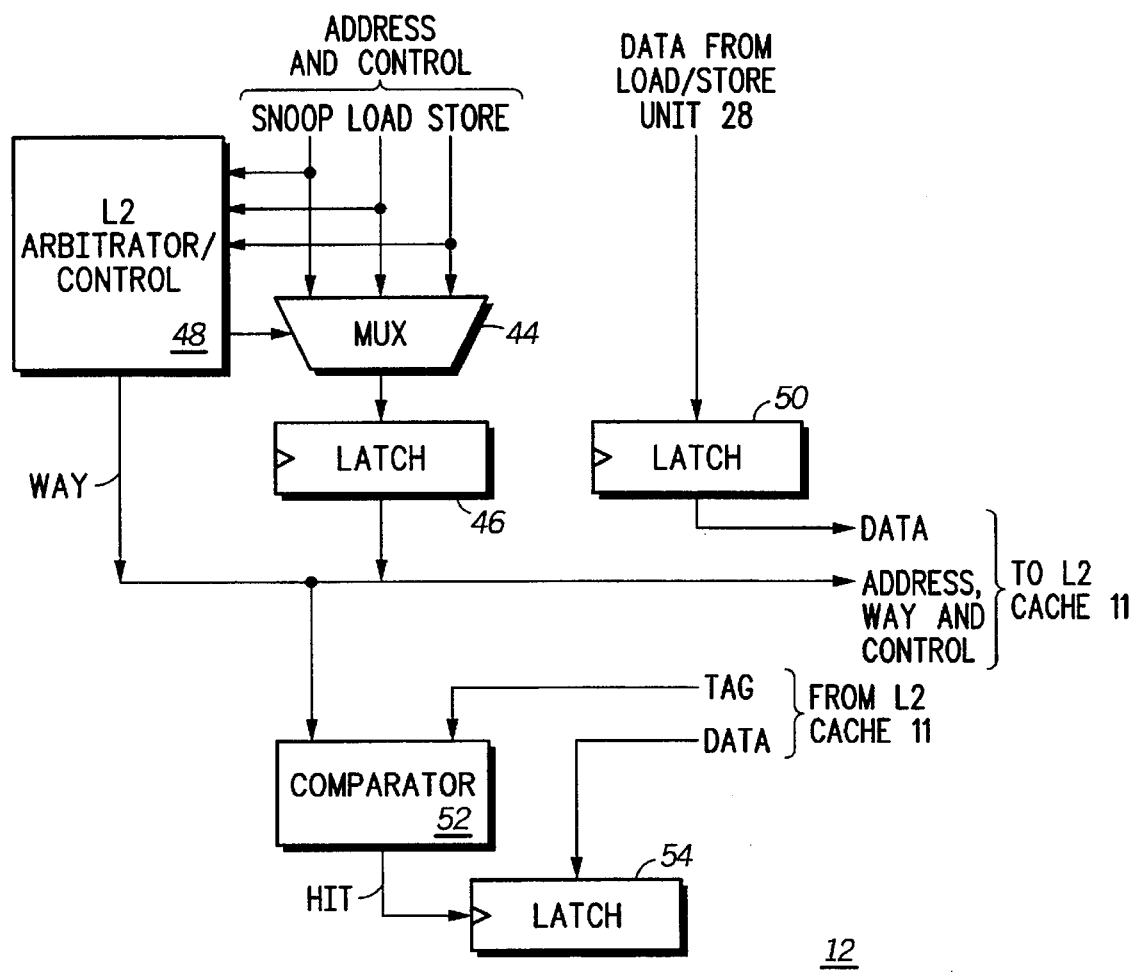
FIG. 4 depicts a block diagram of a portion of the bus interface unit depicted in FIG. 2.

FIG. 4 depicts a block diagram of a portion of BIU 12 depicted in FIG. 2. A multiplexer (labeled "MUX") 44 receives requests from various sources to access memory cache 11: memory coherency operations ("snoops"), data loads, and data stores. Each request contains the address of the accessed data and the various control signals necessary to perform the operation. A latch 46 latches the output from multiplexer 44 and outputs it to memory cache 11. An L2 arbitrator and control unit 48 selects which one requester will be forwarded to memory cache 11 when more than one request occurs at the same time. L2 arbitrator and control unit 48 selects the one requester depending based a priority scheme not relevant to the disclosed invention. L2 arbitrator and control unit 48 also generates the way address bit described above. A latch 50 latches data from load/store unit 28 in the event of a store instruction or a certain type of snoop operation and forwards the data to memory cache 11. A comparator 52 receives each tag output by memory cache 11 and the twenty-one most significant bits of the address previously output to memory cache 11. Comparator 52 performs the compare function described above. Comparator 52 asserts a control signal HIT to the clock input of a latch 54 if the two inputs to comparator 52 are identical. Latch 54 latches the data output from memory cache 11 coincident with the compared tag. BIU 12 contains other circuitry (not shown) to interface with P-bus 4.

Figure 5:
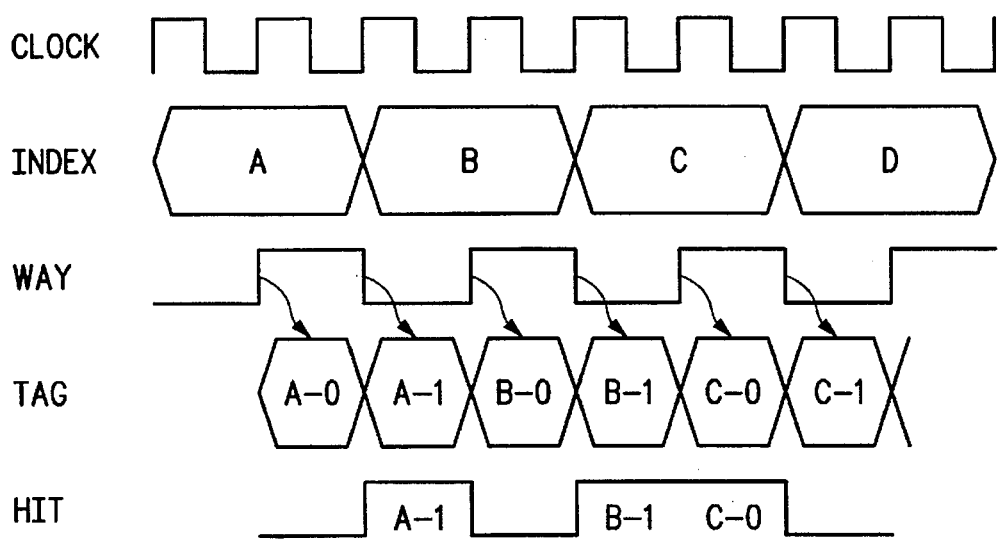
FIG. 5 depicts a timing diagram of the operation of the portion of the bus interface unit depicted in FIG. 4.

FIG. 5 depicts a timing diagram of the operation of the portion of BIU 12 depicted in FIG. 4. FIG. 5 depicts the timing of the address and way signals output by data processor 10 ("INDEX" and "WAY" respectively), the corresponding tag output by memory cache 11 ("TAG"), and the output of comparator 52 ("HIT") relative to the periodic clocking signal input to memory cache 11 ("CLOCK") during a read operation. Data processor 10 forwards four addresses to memory cache 11 corresponding to four requested quad-words, A, B, C, and D. Data processor 10 asserts each address for M CLOCK cycles, where memory cache 11 is an M-way set associative cache. During each address tenure, WAY cycles through all of its possible values, here zero and one. Memory cache 11 returns a tag associated with each address-way indexing set one or more cycles after memory cache 11 receives the indexing set. The tag corresponding to the quad-word A and the first value of way is designated "A-0," the tag corresponding to the quad-word A and the second value of way is designated "A-1," etc. Comparator 52 the compares the tag output by tag block 42 in the same CLOCK cycle. In the depicted example, the quad-words A and B are stored in way-1 and the quad-word C is stored in way-0.

In the depicted embodiment, memory cache 11 is a two-way set associative pipelined cache. Therefore, data processor 10 presents the second way address to memory cache 11 even if the critical quad-word is present in the first way. As described above, data processor 10 can present this second address-way indexing set before it completes its compare operation, improving its overall performance. In other embodiments, memory cache 11 may have a higher degree of set associativity. In these cases, it is likely that memory cache 11 will not present all address-way indexing sets to memory cache 11 if it finds the requested data in the first or second way. Instead, data processor 10 will begin a different cache access. Also, more than one WAY control signal will be necessary for these higher degree associativity caches to uniquely represent all possible ways.

Although the present invention has been described with reference to a specific embodiment, further modifications and improvements will occur to those skilled in the art. For instance, the disclosed invention may stand alone or may be incorporated into data processors traditionally classified as complex instruction set computers or CISC machines. The disclosed invention may be used in an instruction, data or a unified cache. Also, certain functional units may be omitted in certain embodiments or relocated to other areas. It is to be understood therefore, that the invention encompasses all such modifications that do not depart from the spirit and scope of the invention as defined in the appended claims.

I claim:

1. A data processor executing programmed instructions, the data processor storing a plurality of quanta of data in a memory system and a subset of the plurality of quanta of data in an N-way set associative memory cache, the data processor comprising:

an address generation circuit generating a memory address of a memory location in a memory system external to the data processor, the memory address indexing a quantum of data;

an address control unit serially generating and forwarding N address-way indexing sets to an N-way set associative memory cache external to the data processor, where N is an integer greater than one, each one of the N address-way indexing sets comprising a first subset of the memory address and a differing one of N values of a way signal, the first subset identifying N quanta of data stored in the N-way set associative memory cache, the way signal identifying one of the N quanta of data, and compare circuitry receiving a tag associated with each one of the N address-way indexing sets from the N-way set associative memory cache and comparing the tag and a second subset of the memory address, the compare circuitry asserting a control signal responsive to an equivalence of the second subset and the tag;

wherein the address control unit generates a next one of the N address-way indexing sets prior to the compare circuit receiving a first tag.

2. The data processor of claim 1 where N equals two.

3. The data processor of claim 2 further comprising a latching circuit storing the quantum of data received from the N-way set associative memory cache responsive to an assertion of the control signal.

4. The data processor of claim 1 further comprising a latching circuit storing the quantum of data received from the N-way set associative memory cache responsive to an assertion of the control signal.

5. A method of accessing an N-way set associative memory cache from a data processor, the method comprising the steps of:

generating a memory address in a data processor, the memory address indexing one of a plurality of quanta of data in a memory system external to the data processor;

during a first time interval;
first generating a first one of N address-way indexing sets in the data processor, where N is an integer greater than one, each one of the N address-way indexing sets comprising a first subset of the memory address and a differing one of N values of a way signal;

first forwarding the first one of the N address-way indexing sets to an N-way set associative memory cache external to the data processor;

first receiving from the N-way set associative memory cache a first tag and a first quanta of data indexed by the first one of the N address-way indexing sets in the data processor;

first comparing the first tag and a second subset of the memory address in the data processor subsequent to the step of first generating;

during a second time interval;
second generating a second one of N address-way indexing sets in the data processor prior to the step of first comparing;

second forwarding the second one of the N address-way indexing sets to the N-way set associative memory cache;

second receiving from the N-way set associative memory cache a second tag and a second quanta of data indexed by the second one of the N address-way indexing sets in the data processor; and second comparing the second tag and the second subset of the memory address in the data processor.

6. The method of claim 5 further comprising the step of latching the second quanta of data responsive to an equivalence of the second tag and the second subset of the memory address.

* * * * *